(12) United States Patent
Kihara et al.

(10) Patent No.: US 6,602,640 B1
(45) Date of Patent: Aug. 5, 2003

(54) ALKALINE STORAGE BATTERY AND PROCESS FOR THE PRODUCTION THEREOF

(75) Inventors: Masaru Kihara, Itano-Gun (JP); Motoo Tadokoro, Itano-Gun (JP); Yoshitaka Baba, Tokushima (JP)

(73) Assignee: Sanyo Electric Co., Ltd., Osaka (JP)

( * ) Notice: Subject to any disclaimer, the term of this patent is extended or adjusted under 35 U.S.C. 154(b) by 206 days.

(21) Appl. No.: 09/669,573

(22) Filed: Sep. 26, 2000

(30) Foreign Application Priority Data

Sep. 28, 1999 (JP) .......................................... 11-273861

(51) Int. Cl.⁷ .............................................. H01M 10/24

(52) U.S. Cl. .................................... 429/223; 429/218.1

(58) Field of Search ............................ 429/218.1, 223, 429/229

(56) References Cited

U.S. PATENT DOCUMENTS

| 6,007,946 A | * | 12/1999 | Yano et al. ................. 429/206 |
| 6,203,945 B1 | * | 3/2001 | Baba et al. ................. 423/594 |
| 6,287,726 B1 | * | 9/2001 | Ohta et al. ................ 429/218.1 |

FOREIGN PATENT DOCUMENTS

| JP | A-10-74512 | 3/1998 |
| JP | 2765008 | 4/1998 |

* cited by examiner

Primary Examiner—Randy Gulakowski
Assistant Examiner—Monique Wills
(74) Attorney, Agent, or Firm—Nixon & Vanderhye P.C.

(57) ABSTRACT

An alkaline storage battery comprising a positive electrode active material mainly composed of nickel hydroxide, characterized in that the nickel hydroxide is a higher order nickel hydroxide covered with a cobalt compound on the surface thereof or in the vicinity thereof and the higher order nickel hydroxide is provided with at least one compound selected from the group consisting of yttrium compound, erbium compound and ytterbium compound on the surface thereof or in the vicinity

16 Claims, 3 Drawing Sheets

ALKALINE STORAGE BATTERY AND PROCESS FOR THE PRODUCTION THEREOF

BACKGROUND OF THE INVENTION

1. Field of the Invention

The present invention relates to an alkaline storage battery such as nickel-hydrogen storage battery and nickel-cadmium storage battery. More particularly, the present invention relates to an improvement in the positive electrode active material mainly composed of nickel hydroxide to be incorporated in non-sintered nickel electrode and the process for the production thereof.

2. Description of the Related Art

A nickel electrode which is normally used as a positive electrode for this kind of alkaline storage battery undergoes a reversible reaction involving the conversion of divalent nickel hydroxide $(Ni(OH)_2)$ to trivalent nickel oxyhydroxide (NiOOH) as represented by the following equation (1) during charging and the conversion of trivalent nickel oxyhydroxide (NiOOH) to divalent nickel hydroxide $(Ni(OH)_2)$ as represented by the following equation (2) during discharging.

$$Ni(OH)_2 + OH^- \rightarrow NiOOH + H_2O + e^- \qquad (1)$$

$$Ni(OH)_2 + OH^- \rightarrow NiOOH + H_2O + e^- \qquad (2)$$

This reaction is not a complete reversible reaction. Thus, during the process of reconversion of nickel oxyhydroxide (NiOOH) to nickel hydroxide $(Ni(OH)_2)$ by discharging, the discharging reaction stops when the valence of nickel hydroxide thus produced is about 2.2. Accordingly, electricity according to a valence of 0.2 always remains in the negative electrode as an irreversible content. The remaining electricity makes no contribution to the capacity of the battery.

Methods for eliminating the irreversible capacity in the negative electrode have been proposed in Patent No. 2765008, JP-A-10-74512 (The term "JP-A" as used herein means an "unexamined published Japanese patent application"), etc. The method proposed in Patent No. 2765008 involves the use of, as a positive electrode active material, a nickel oxide having a valence of greater than 2 obtained by partly subjecting nickel hydroxide to chemical oxidation. In this manner, the negative electrode has no electricity left behind as an irreversible content. Thus, all the electricity makes contribution to the capacity of the battery.

On the other hand, the method proposed in JP-A-10-74512 involves the filling of a porous metal material with nickel oxyhydroxide particles coated with cobalt oxyhydroxide or cobalt hydroxide or a solid solution mainly composed of nickel oxyhydroxide as an active material. In this manner, the coating of nickel hydroxide particles as active material with cobalt oxyhydroxide as an electrically-conducting agent makes it possible to provide firm and uniform physical disposition of electrically-conducting agent as well as improve the physical packing of the active material as compared with the use of particulate cobalt hydroxide as an electrically-conducting agent. Further, the resulting positive electrode can be kept partly oxidized. Accordingly, a battery having a reduced irreversible electricity can be formed.

However, the positive electrode active material obtained by oxidizing nickel hydroxide to enhance the order thereof and give a higher order nickel hydroxide or the positive electrode prepared with such a positive electrode active material is disadvantageous in that when stored in the air, it undergoes a reaction represented by the following equation (3) to cause the higher order nickel hydroxide to be reduced to nickel hydroxide $(Ni(OH)_2)$, making it difficult to store over an extended period of time.

$$NiOOH + 1/2 H_2O \rightarrow Ni(OH)_2 + 1/4 O_2 \qquad (3)$$

Further, an alkaline storage battery comprising a positive electrode plate prepared with a positive electrode active material obtained by oxidizing nickel hydroxide to higher order nickel hydroxide allows the positive electrode to undergo self-discharging when the positive electrode active material reacts with an electrolytic solution during storage. During this self-discharging, the negative electrode tries to discharge by the same capacity. However, the negative electrode has no electricity and thus oxidizes itself instead of discharging. Thus, an oxide layer is formed on the surface of the negative electrode, passivating the negative electrode. As a result, the capacity of the negative electrode is lowered, making it impossible to obtain desired properties.

SUMMARY OF THE INVENTION

Therefore, the present invention has been worked out to eliminate the foregoing problems. An object of the present invention is to provide a high capacity alkaline storage battery having a reduced excess capacity of negative electrode by making nickel hydroxide of raised order (higher order nickel hydroxide) or nickel positive electrode comprising this higher order nickel hydroxide as a positive electrode active material storable over an extended period of time while inhibiting self-discharging of the nickel positive electrode. In order to solve the foregoing problems, the alkaline storage battery according to the invention comprises a positive electrode active material mainly composed of nickel hydroxide, characterized in that the nickel hydroxide is a higher order nickel hydroxide covered with a cobalt compound on the surface thereof or in the vicinity thereof and the higher order nickel hydroxide is provided with at least one compound selected from the group consisting of yttrium compound, erbium compound and ytterbium compound on the surface thereof or in the vicinity thereof.

The use of such a higher order nickel hydroxide as a positive electrode active material makes it possible to reduce excess capacity of negative electrode. Further, since the surface of the higher order nickel hydroxide is coated with a cobalt compound, a good electrically-conductive network can be formed in the positive electrode to enhance the percent use of active material, making it possible to obtain a high capacity storage battery. When the higher order nickel hydroxide coated with a cobalt compound on the surface thereof is provided with at least one compound selected from the group consisting of yttrium compound, erbium compound and ytterbium compound on the surface thereof or in the vicinity thereof, the higher order nickel hydroxide can be prevented from discharging itself because these additive compounds can enhance the oxygen production potential. As a result, the higher order nickel hydroxide can be kept stable during prolonged storage. Further, even a battery assembled with this active material can be prevented from discharging itself, making it possible to obtain a high capacity alkaline storage battery having a reduced excess capacity of negative electrode.

When the cobalt compound with which the surface of the higher order nickel hydroxide is coated is a high order cobalt compound containing alkaline cations, there is no boundary between the high order cobalt compound formed on the surface of the higher order nickel hydroxide and the higher order nickel hydroxide as core, giving firm bond between nickel and cobalt that enhances the mechanical strength of active material particles and lowers the electrical resistance between nickel and cobalt. The resulting high rate discharge capacity is raised. The presence of alkaline cations prevents the cobalt compound from being oxidized by an oxidizing agent as well as by water, making it possible to secure stability of the cobalt compound and enhance the oxygen production potential and hence further inhibit the self-discharging after storage.

When the average valence of the higher order nickel hydroxide is lower than 2.1, the irreversible capacity of the negative electrode cannot be sufficiently eliminated, making it impossible to effectively utilize the inner space of the battery. On the contrary, when the average valence of the higher order nickel hydroxide is higher than 2.3, the dischargeability of the negative electrode is lowered. Accordingly, the average valence of the higher order nickel hydroxide is preferably from 2.10 to 2.30.

Preferably, the positive electrode active material comprises a higher order nickel hydroxide of complex particles covered with a cobalt compound on the surface thereof and said higher order nickel hydroxide is provided with at least one compound selected from the group consisting of yttrium compound, erbium compound and ytterbium compound on the surface thereof or in the vicinity thereof.

Preferably, the higher order cobalt compound is immersed into the higher order nickel oxide particles and boundary between said higher order cobalt compound and the higher order nickel oxide particles is diminished and composition changes successively.

Preferably, the higher order cobalt compound is localized on a surface of said higher order nickel oxide particles.

Preferably, said positive electrode active material further comprises zinc oxide in soluble state.

Preferably, the positive electrode active material is filled with a porous metal plate as a current collecting plate to form a positive electrode.

Preferably, the positive electrode active material and conductive particles are formed to be positive electrode.

The process for the production of an alkaline storage battery according to the invention comprises a retaining step of allowing a cobalt compound and at least one compound selected from the group consisting of yttrium compound, erbium compound and ytterbium compound to be retained on the surface of the nickel hydroxide or in the vicinity thereof, and an order-enhancing step of enhancing the order of the nickel hydroxide. Alternatively, the process for the production of an alkaline storage battery according to the invention comprises a retaining step of allowing a cobalt compound to be retained on the surface of the nickel hydroxide or in the vicinity thereof, an order-enhancing step of enhancing the order of the nickel hydroxide, and an attachment step of allowing at least one compound selected from the group consisting of yttrium compound, erbium compound and ytterbium compound to be attached to the higher order nickel hydroxide on the surface thereof or in the vicinity thereof.

The provision of the foregoing various steps makes it possible to coat the higher order nickel hydroxide with a cobalt compound on the surface thereof or in the vicinity thereof and provide the higher order nickel hydroxide with at least one compound selected from the group consisting of yttrium compound, erbium compound and ytterbium compound on the surface thereof or in the vicinity thereof. In this arrangement, excess capacity of negative electrode can be eliminated. Further, a good electrically-conductive network can be formed in the positive electrode to enhance the percent use of active material, making it possible to obtain a high capacity storage battery. Further, the higher order nickel hydroxide can be kept stable even over an extended period of time. Moreover, even a battery assembled with this active material can be prevented from discharging itself, making it possible to obtain a high capacity alkaline storage battery having a reduced excess capacity of negative electrode.

The oxidation of nickel hydroxide with an oxidizing agent at the order-enhancing step makes it possible to enhance the order of nickel hydroxide by merely adding a simple step of adjusting the supplied amount of the oxidizing agent. In this manner, this kind of battery can be easily produced.

By mixing nickel hydroxide with a cobalt compound or coating nickel hydroxide with a cobalt compound at the retaining step, and then subjecting the mixture or coated material to heat treatment in the presence of an alkaline aqueous solution and oxygen so that the cobalt compound is enhanced to higher order, a good electrically-conductive high order cobalt layer can be formed on the surface of the higher order nickel hydroxide, making it possible to form a firm electrically-conductive network in the positive electrode. In this arrangement, the high rate discharge capacity is enhanced. Further, since the high order cobalt layer contains alkaline cations, the oxidation of the cobalt compound by the oxidizing agent as well as by water can be inhibited, making it possible to secure the stability of the cobalt compound and enhance the oxygen production potential and hence further inhibit self-discharging after storage.

DESCRIPTION OF THE PREFERRED EMBODIMENT

1. Preparation of Nickel Positive Electrode (1) EXAMPLE 1

To an aqueous solution of nickel sulfate, zinc sulfate and cobalt sulfate in admixture such that zinc content and cobalt content were 3% by weight and 1% by weight, respectively, based on 100% by weight of metallic nickel was gradually added an aqueous solution of sodium hydroxide with stirring. The reaction solution was kept such that the pH value thereof was from 13 to 14 to cause particulate nickel hydroxide in which cobalt is comprised in a soluble state to be precipitated.

Subsequently, to the solution in which particulate nickel hydroxide had been precipitated was added an aqueous solution of cobalt sulfate containing yttrium sulfate. The reaction solution was kept such that the pH value thereof was from 9 to 10 to cause cobalt hydroxide and a yttrium compound to be precipitated around spherical hydroxide particles mainly composed of nickel hydroxide as crystal nuclei, thereby producing composite particles. These composite particles had cobalt hydroxide deposited thereon in an amount of 10% by weight based on the spherical hydroxide particles and a yttrium compound deposited therein in an amount of 0.5% by weight based on the spherical hydroxide particles as calculated in terms of metallic yttrium.

The composite particles thus obtained were washed with pure water in an amount of ten times that of the composite particles three times, dehydrated, and then dried to prepare a particulate nickel hydroxide comprising a cobalt hydroxide coat layer having a yttrium compound incorporated therein on the surface thereof.

Subsequently, to the particulate nickel hydroxide comprising a cobalt hydroxide coat layer having a yttrium compound incorporated therein on the surface thereof thus obtained was added dropwise sodium hypochloride (NaClO) (oxidizing agent) in a predetermined amount while being stirred in a 32 wt-% aqueous solution of sodium hydroxide which had been kept at a temperature of from 40° C. to 60° C. so that nickel hydroxide inside the particles was enhanced to higher order to produce higher order nickel hydroxide.

The cleaning step can be omitted. NaClO as the oxidizing agent can be replaced to $Na_2S_2O_8$.

The amount of sodium hypochloride (NaClO) to be added dropwise to the aqueous solution of sodium hydroxide was such that divalent nickel hydroxide was oxidized to trivalent nickel hydroxide by 20% by weight. These composite particles were then subjected to chemical analysis. As a result, the average valence was found to be 2.2. The higher order nickel hydroxide thus prepared was used as a positive electrode active material a1 in Example 1.

Subsequently, to the positive electrode active material a1 thus prepared was added 40 wt-% of a dispersion of HPC (hydroxyl propyl cellulose) with stirring to prepare an active material slurry. The active material slurry thus prepared was then packed into a substrate made of a foamed nickel to a predetermined packing density. The substrate was dried, and the rolled to a predetermined thickness to prepare a non-sintered nickel positive electrode. The non-sintered nickel positive electrode thus prepared was used as a nickel positive electrode in Example 1.

(2) EXAMPLE 2

A particulate nickel hydroxide comprising a cobalt hydroxide coat layer having a yttrium compound incorporated therein on the surface thereof was prepared in the same manner as in Example 1. The particulate nickel hydroxide compound thus prepared was then subjected to alkali heat treatment by being sprayed with a 25 wt-% sodium hydroxide in a 100° C. oxygen atmosphere for 0.5 hours.

This alkali heat treatment causes the destruction and disturbance of the crystal structure of cobalt hydroxide covering the surface of the particulate nickel hydroxide and strongly accelerates the oxidation of cobalt hydroxide to a higher order cobalt compound having an average valence of greater than 2, e.g., 2.9. In this manner, composite particles made of particulate nickel hydroxide having a high order cobalt compound containing electrically conductive alkaline cations localized on the surface thereof can be obtained. According to the localized high order cobalt compound, resistance between active material particles can be reduced.

Subsequently, these composite particles thus obtained were washed with pure water in an amount of ten times that of the composite particles three times, dehydrated, and then dried to prepare a particulate nickel hydroxide comprising a cobalt hydroxide coat layer having a yttrium compound incorporated therein on the surface thereof.

Subsequently, to the particulate nickel hydroxide thus obtained was added dropwise sodium hypochloride (NaClO) (oxidizing agent) in a predetermined amount (the same as in Example 1) while being stirred in a 32 wt-% aqueous solution of sodium hydroxide which had been kept at a temperature of from 40° C. to 60° C. so that nickel hydroxide inside the particles was enhanced to higher order to produce higher order nickel hydroxide. The higher order nickel hydroxide thus produced was then subjected to chemical analysis. As a result, the average valence was found to be 2.2. The higher order nickel hydroxide thus prepared was used as a positive electrode active material b1 in Example 2.

Subsequently, to the positive electrode active material b1 thus prepared was added 40 wt-% of a dispersion of HPC with stirring to prepare an active material slurry. The active material slurry thus prepared was then packed into a substrate made of a foamed nickel to a predetermined packing density. The substrate was dried, and the rolled to a predetermined thickness to prepare a non-sintered nickel positive electrode. The non-sintered nickel positive electrode thus prepared was used as a nickel positive electrode b in Example 2.

(3) EXAMPLE 3

To an aqueous solution of nickel sulfate, zinc sulfate and cobalt sulfate in admixture such that zinc content and cobalt content were 3% by weight and 1% by weight, respectively, based on 100% by weight of metallic nickel was gradually added an aqueous solution of sodium hydroxide with stirring. The reaction solution was kept such that the pH value thereof was from 13 to 14 to cause particulate nickel hydroxide to be precipitated. Subsequently, to the solution in which particulate nickel hydroxide had been precipitated was added an aqueous solution of cobalt sulfate. The reaction solution was kept such that the pH value thereof was from 9 to 10 to cause cobalt hydroxide to be precipitated around spherical hydroxide particles mainly composed of nickel hydroxide as crystal nuclei, thereby producing composite particles.

These composite particles had cobalt hydroxide deposited thereon in an amount of 10% by weight based on the spherical hydroxide particles.

The composite particles thus obtained were washed with pure water in an amount of ten times that of the composite particles three times, dehydrated, and then dried to prepare a particulate nickel hydroxide comprising a cobalt hydroxide coat layer on the surface thereof. The particulate nickel hydroxide compound thus prepared was then subjected to alkali heat treatment by being sprayed with a 25 wt-% sodium hydroxide in a 100° C. oxygen atmosphere for 0.5 hours in the same manner as in Example 2.

This alkali heat treatment causes the destruction and disturbance of the crystal structure of cobalt hydroxide covering the surface of the particulate nickel hydroxide and strongly accelerates the oxidation of cobalt hydroxide to a higher order cobalt compound having an average valence of greater than 2, e.g., 2.9. In this manner, composite particles made of particulate nickel hydroxide having a high order cobalt compound containing electrically conductive alkaline cations localized on the surface thereof can be obtained. Subsequently, these composite particles thus obtained were washed with pure water in an amount of ten times that of the composite particles three times, dehydrated, and then dried to prepare a particulate nickel hydroxide comprising a cobalt hydroxide coat layer on the surface thereof.

Subsequently, to the particulate nickel hydroxide having a high order cobalt compound coat layer thereon thus obtained was added dropwise sodium hypochloride (NaClO) (oxidizing agent) in a predetermined amount (the same as in Example 1) while being stirred in a 32 wt-% aqueous solution of sodium hydroxide which had been kept at a temperature of from 40° C. to 60° C. so that nickel hydroxide inside the particles was enhanced to higher order to produce higher order nickel hydroxide. The higher order nickel hydroxide thus produced was then subjected to chemical analysis. As a result, the average valence was found to be 2.2. The higher order nickel hydroxide thus prepared was used as a positive electrode active material c1 in Example 3.

Subsequently, to the positive electrode active material b1 thus prepared were added 0.5% by weight of diyttrium trioxide and 40 wt-% of a dispersion of HPC with stirring to prepare an active material slurry. The active material slurry thus prepared was then packed into a substrate made of a foamed nickel to a predetermined packing density. The substrate was dried, and the rolled to a predetermined thickness to prepare a non-sintered nickel positive electrode. The non-sintered nickel positive electrode thus prepared was used as a nickel positive electrode c in Example 3. By adding diyttrium trioxide to the positive electrode active material c1, diyttrium trioxide is attached to the surface of the higher order nickel hydroxide.

(4) EXAMPLE 4

To the positive electrode active material c1 of Example 3 thus prepared were added 0.5% by weight of dierbium trioxide and 40 wt-% of a dispersion of HPC with stirring to prepare an active material slurry. The active material slurry thus prepared was then packed into a substrate made of a foamed nickel to a predetermined packing density. The substrate was dried, and the rolled to a predetermined thickness to prepare a non-sintered nickel positive electrode. The non-sintered nickel positive electrode thus prepared was used as a nickel positive electrode d in Example 4. By adding dierbium trioxide to the positive electrode active material c1, dierbium trioxide is attached to the surface of the higher order nickel hydroxide.

(5) EXAMPLE 5

To the positive electrode active material c1 of Example 3 thus prepared were added 0.5% by weight of diytterbium trioxide and 40 wt-% of a dispersion of HPC with stirring to prepare an active material slurry. The active material slurry thus prepared was then packed into a substrate made of a foamed nickel to a predetermined packing density. The substrate was dried, and the rolled to a predetermined thickness to prepare a non-sintered nickel positive electrode. The non-sintered nickel positive electrode thus prepared was used as a nickel positive electrode e in Example 5. By adding diytterbium trioxide to the positive electrode active material c1, diytterbium trioxide is attached to the surface of the higher order nickel hydroxide.

(6) COMPARATIVE EXAMPLE 1

To an aqueous solution of nickel sulfate, zinc sulfate and cobalt sulfate in admixture such that zinc content and cobalt content were 3% by weight and 1% by weight, respectively, based on 100% by weight of metallic nickel was gradually added an aqueous solution of sodium hydroxide with stirring. The reaction solution was kept such that the pH value thereof was from 13 to 14 to cause particulate nickel hydroxide to be precipitated.

Subsequently, to the solution in which particulate nickel hydroxide had been precipitated was added an aqueous solution of cobalt sulfate. The reaction solution was kept such that the pH value thereof was from 9 to 10 to cause cobalt hydroxide to be precipitated around spherical hydroxide particles mainly composed of nickel hydroxide as crystal nuclei, thereby producing composite particles. These composite particles had cobalt hydroxide deposited thereon in an amount of 10% by weight based on the spherical hydroxide particles. The composite particles thus obtained were washed with pure water in an amount of ten times that of the composite particles three times, dehydrated, and then dried to prepare a particulate nickel hydroxide comprising a cobalt hydroxide coat layer on the surface thereof.

Subsequently, to the particulate nickel hydroxide comprising a cobalt hydroxide coat layer on the surface thereof thus obtained was added dropwise sodium hypochloride (NaClO) (oxidizing agent) in a predetermined amount (the same as in Example 1) while being stirred in a 32 wt-% aqueous solution of sodium hydroxide which had been kept at a temperature of 60° C. so that nickel hydroxide inside the particles was enhanced to higher order to produce higher order nickel hydroxide. The higher order nickel hydroxide thus produced was then subjected to chemical analysis. As a result, the average valence was found to be 2.2. The higher order nickel hydroxide thus prepared was used as a positive electrode active material x1 in Comparative Example 1.

Subsequently, to the positive electrode active material x1 thus prepared was added 40 wt-% of a dispersion of HPC with stirring to prepare an active material slurry. The active material slurry thus prepared was then packed into a substrate made of a foamed nickel to a predetermined packing density. The substrate was dried, and the rolled to a predetermined thickness to prepare a non-sintered nickel positive electrode. The non-sintered nickel positive electrode thus prepared was used as a nickel positive electrode x in Comparative Example 1.

(7) COMPARATIVE EXAMPLE 2

To an aqueous solution of nickel sulfate, zinc sulfate and cobalt sulfate in admixture such that zinc content and cobalt content were 3% by weight and 1% by weight, respectively, based on 100% by weight of metallic nickel was gradually added an aqueous solution of sodium hydroxide with stirring. The reaction solution was kept such that the pH value thereof was from 13 to 14 to cause particulate nickel hydroxide to be precipitated. Subsequently, to the solution in which particulate nickel hydroxide had been precipitated was added an aqueous solution of cobalt sulfate. The reaction solution was kept such that the pH value thereof was from 9 to 10 to cause cobalt hydroxide to be precipitated around spherical hydroxide particles mainly composed of nickel hydroxide as crystal nuclei, thereby producing composite particles.

These composite particles had cobalt hydroxide deposited thereon in an amount of 10% by weight based on the spherical hydroxide particles.

The composite particles thus obtained were washed with pure water in an amount of ten times that of the composite particles three times, dehydrated, and then dried to prepare a particulate nickel hydroxide comprising a cobalt hydroxide coat layer on the surface thereof. The particulate nickel hydroxide compound thus prepared was then subjected to alkali heat treatment by being sprayed with a 25 wt-% sodium hydroxide in a 100° C. oxygen atmosphere for 0.5 hours in the same manner as in Example 2. The composite particles thus obtained were washed with pure water in an amount of ten times that of the composite particles three times, dehydrated, and then dried to prepare a particulate nickel hydroxide comprising a cobalt hydroxide coat layer on the surface thereof.

Subsequently, to the particulate nickel hydroxide having a high order cobalt compound coat layer thereon thus obtained was added dropwise sodium hypochloride (NaClO) (oxidizing agent) in a predetermined amount while being stirred in a 32 wt-% aqueous solution of sodium hydroxide which had been kept at a temperature of 60° C. so that nickel hydroxide inside the particles was enhanced to higher order to produce higher order nickel hydroxide. The amount of sodium hypochloride (NaClO) to be added dropwise to the aqueous solution of sodium hydroxide was such that divalent nickel hydroxide was oxidized to trivalent nickel hydroxide by 20% by weight. These composite particles were then subjected to chemical analysis. As a result, the average valence was found to be 2.5. The higher order nickel hydroxide thus prepared was used as a positive electrode active material y1 in comparative Example 2.

Subsequently, to the positive electrode active material y1 thus prepared was added 40 wt-% of a dispersion of HPC with stirring to prepare an active material slurry. The active material slurry thus prepared was then packed into a substrate made of a foamed nickel to a predetermined packing density. The substrate was dried, and the rolled to a predetermined thickness to prepare a non-sintered nickel positive electrode. The non-sintered nickel positive electrode thus prepared was used as a nickel positive electrode y in comparative Example 2.

2. Preparation of Hydrogen-occluding Alloy Negative Electrode

Amischmetal (Mm: mixture of rare earth elements), nickel, cobalt, aluminum and manganese were mixed at a ratio of 1:3.6:0.6:0.2:0.6. The mixture was then subjected to induction heating in a high-frequency induction furnace in an argon gas atmosphere to form a molten alloy. The molten alloy thus obtained was then cooled by a known method to prepare an ingot of hydrogen-occluding alloy represented by the composition formula $Mn_{1.0}Ni_{3.6}Co_{0.6}Al_{0.2}Mn_{0.6}$. The ingot of hydrogen-occluding alloy was then mechanically ground to form a hydrogen-occluding alloy powder having an average particle diameter of about 100 $\mu$m. The hydrogen-occluding alloy powder thus obtained was then mixed with a binder such as polyethylene oxide and a proper amount of water to prepare a hydrogen-occluding alloy paste. The paste thus prepared was applied to a punching metal, dried, and then rolled to a thickness of 0.4 mm to prepare a hydrogen-occluding alloy negative electrode.

3. Preparation of Nickel-hydrogen Storage Battery

The non-sintered nickel positive electrodes a, b, c, d and e of Examples 1 to 5 and the non-sintered nickel positive electrodes x and y of Comparative Examples 1 and 2 thus prepared were each wound with the hydrogen-occluding alloy negative electrode mentioned above with a separator made of a nonwoven polypropylene or nylon cloth provided interposed therebetween to prepare a spiral electrode block which was then inserted into an outer can. Into the outer can was then poured a 30 wt-% aqueous solution of potassium hydroxide as an electrolytic solution. The outer can was then sealed to prepare an AA size nickel-hydrogen storage battery having a nominal capacity of 1,200 Ah.

The battery prepared with the non-sintered nickel positive electrode a was used as a battery A of Example 1, the battery prepared with the non-sintered nickel positive electrode b was used as a battery B of Example 2, the battery prepared with the non-sintered nickel positive electrode c was used as a battery C of Example 3, the battery prepared with the non-sintered nickel positive electrode d was used as a battery D of Example 4, and the battery prepared with the non-sintered nickel positive electrode e was used as a battery E of Example 5. Further, the battery prepared with the non-sintered nickel positive electrode x was used as a battery X of Comparative Example 1, and the battery prepared with the non-sintered nickel positive electrode y was used as a battery Y of Comparative Example 2.

4. Measurement of Valence of Higher Order Nickel Hydroxide (1) Change of Valence After Storage in the Form of Powder (Active Material)

The positive electrode active material a1 of Example 1, the positive electrode active material b1 of Example 2, and the positive electrode active material x1 of Comparative Example 1 thus prepared were each measured for change of valence of higher order nickel hydroxide after storage at room temperature (25° C.). The measurements are set forth in FIG. 1. As can be seen in the measurements (FIG. 1), the positive electrode active material a1 of Example 1 and the positive electrode active material b1 of Example 2 showed little change of valence of higher order nickel hydroxide even after prolonged storage while the positive electrode active material x1 of Comparative Example 1 begins to show a drop of valence of higher order nickel hydroxide immediately after the beginning of storage and a constant value (2.17) of valence after 50 days of storage.

Figure 1:
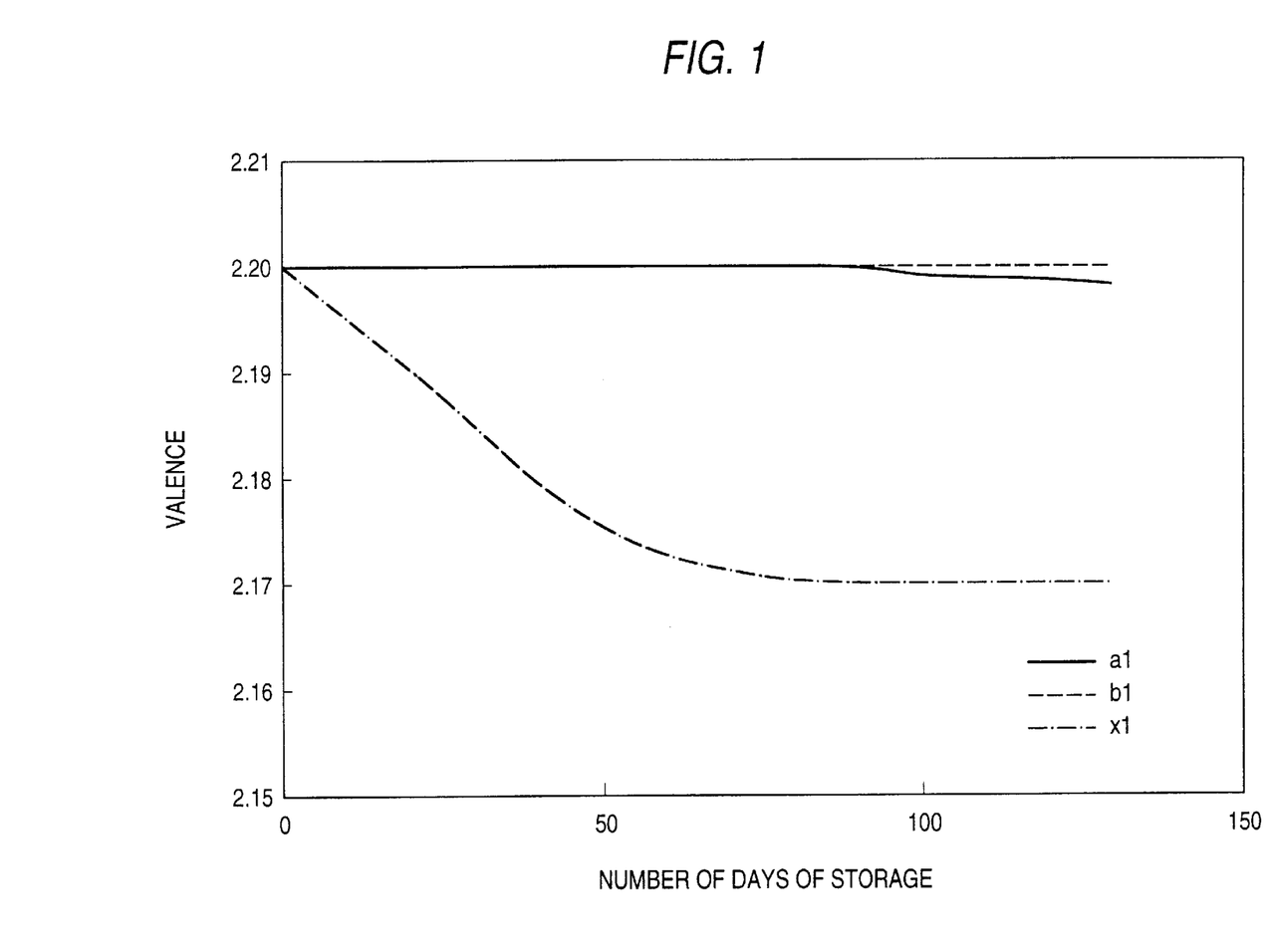
FIG. 1 is a graph illustrating the relationship between the number of days of storage of higher order nickel hydroxide and the change of valence thereof.

This is presumably because the higher order nickel hydroxide in the positive electrode active material x1 of Comparative Example 1 is not coated with a yttrium compound and thus, when stored in the air, undergoes the reaction represented by the formula (3) that causes the higher order nickel hydroxide to be reduced, lowering the valence of the higher order nickel hydroxide. Accordingly, higher order nickel hydroxide which is not coated with an yttrium compound on the surface thereof can hardly be stored over an extended period of time while higher order nickel hydroxide coated with an yttrium compound on the surface thereof can be stored over an extended period of time.

The comparison of the positive electrode active material a1 of Example 1 with the positive electrode active material b1 of Example 2 shows that the positive electrode active material b1 of Example 2 shows a smaller drop of valence of higher order nickel hydroxide than the positive electrode active material a1 of Example 1. This is presumably because the positive electrode active material b1 of Example 2 is prepared by a process involving an alkali heat treatment that coverts cobalt hydroxide to a high order cobalt compound containing alkaline cations which prevent the oxidation by an oxidizing agent.

(2) Measurement of Change of Valence After Storage in the Form of Electrode Plate Subsequently, the non-sintered nickel positive electrode a of Example 1, the non-sintered nickel positive electrode b of Example 2, the non-sintered nickel positive electrode c of Example 3, the non-sintered nickel positive electrode d of Example 4, the non-sintered nickel positive electrode e of Example 5, and the non-sintered nickel positive electrode x of Comparative Example 1 we re each measured for change of valence of higher order nickel hydroxide after storage at room temperature (25° C). The measurements are set forth in FIG. 2.

As can be seen in the measurements (FIG. 2), the non-sintered nickel positive electrodes a to e of Examples 1 to 5 showed little change of valence of higher order nickel hydroxide even after prolonged storage while the non-sintered nickel positive electrode x of Comparative Example 1 begins to show a drop of valence of higher order nickel hydroxide immediately after the beginning of storage and a constant value (2.18) of valence after 50 days of storage.

Figure 2:
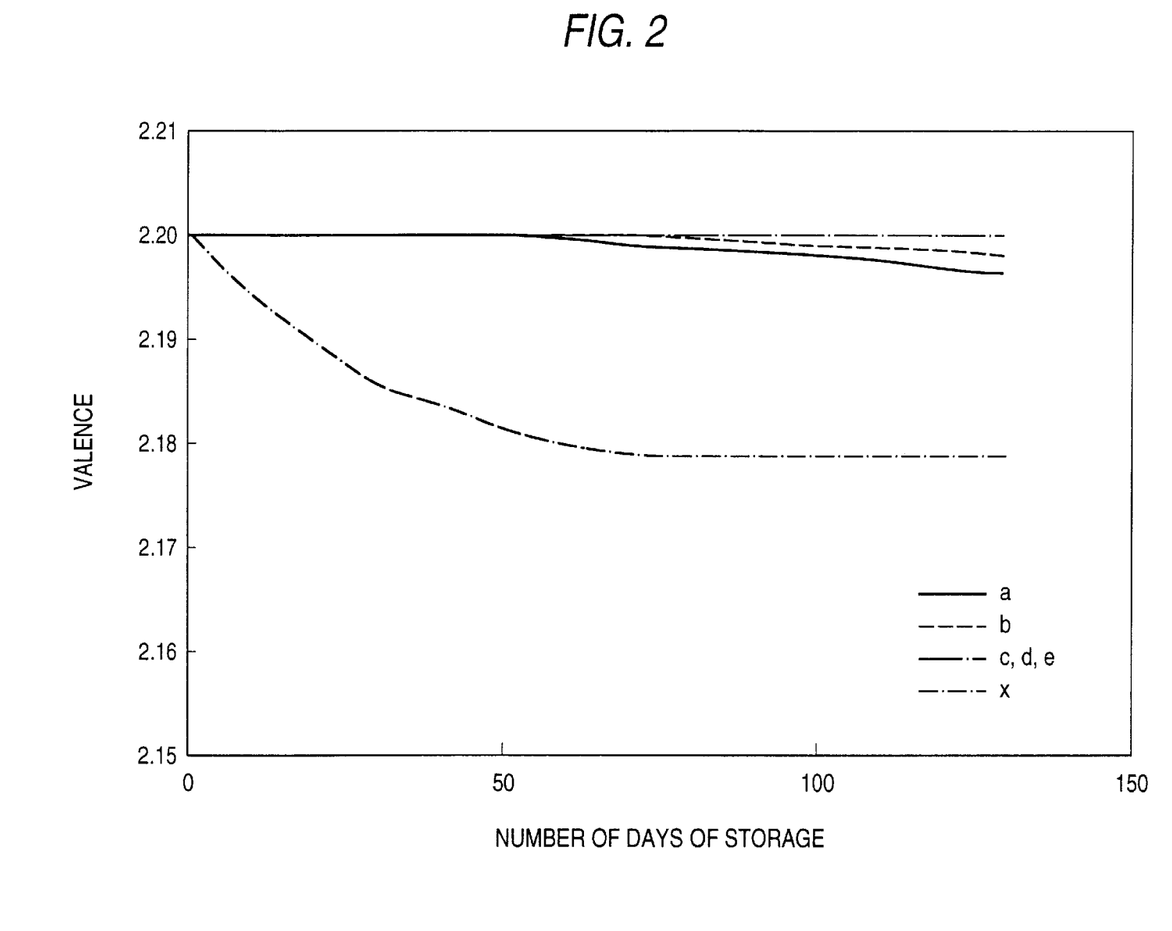
FIG. 2 is a graph illustrating the relationship between the number of days of storage of positive electrode comprising higher order nickel hydroxide and the change of valence thereof.

This is presumably because the higher order nickel hydroxide in the non-sintered nickel positive electrode x of Comparative Example 1 is not coated with a yttrium compound and thus, when stored in the air, undergoes the reaction represented by the formula (3) that causes the higher order nickel hydroxide to be reduced, lowering the valence of the higher order nickel hydroxide. Accordingly, higher order nickel hydroxide which is not coated with a yttrium compound, erbium compound or ytterbium compound on the surface thereof can hardly be stored over an extended period of time while higher order nickel hydroxide coated with a yttrium compound, erbium compound or ytterbium compound on the surface thereof can be stored over an extended period of time.

The comparison of the non-sintered nickel positive electrodes a to e of the various examples shows that the nickel positive electrodes c, d and e show little valence change and the valence change increases in the order of nickel positive electrode b and nickel positive electrode a. This is because that if a yttrium compound, erbium compound or ytterbium compound is added to the slurry, such a compound is attached to the surface of the higher order nickel hydroxide coated with a high order cobalt compound containing alkaline cations on the surface thereof to accelerate the effect exerted by the addition of such a compound.

Referring to the nickel positive electrodes b and a, on the other hand, the surface of nickel hydroxide is coated with an yttrium compound before enhancing the order of nickel hydroxide. Thus, the yttrium compound penetrates into the interior of nickel hydroxide, making it impossible to sufficiently attain the effect exerted by the addition of such a compound. The preparation of the nickel positive electrode a doesn't involve alkali heat treatment, preventing nickel hydroxide from being converted to high order cobalt compound containing alkaline cations. Thus, higher order nickel hydroxide is somewhat oxidized.

5. Measurement of Discharge Capacity

Subsequently, the battery A of Example 1, the battery B of Example 2, the battery C of Example 3, the battery D of Example 4, the battery E of Example 5, the battery X of Comparative Example 1, and the battery Y of Comparative Example 2 thus prepared were each measured for discharge capacity at every passage of time between shortly after the injection of electrolytic solution and the first discharging at the activation step. The measurements are set forth in FIG. 3.

Figure 3:
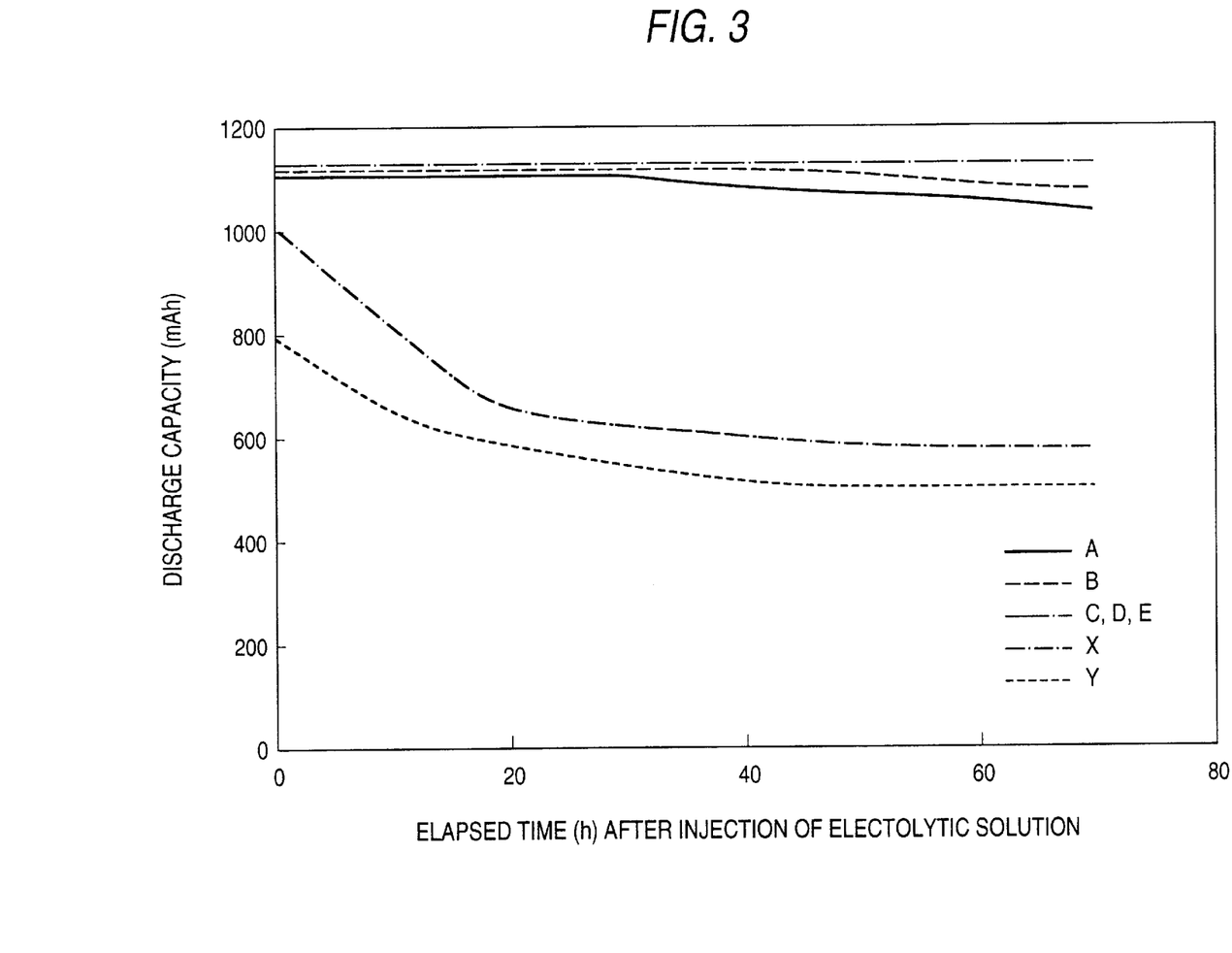
FIG. 3 is a graph illustrating the relationship between the number of days of storage of battery comprising higher order nickel hydroxide and the change of valence thereof.

As can be seen in FIG. 3, the battery X of Comparative Example 1 and the battery Y of Comparative Example 2 show a remarkable drop of battery capacity with the passage of time from the injection of electrolytic solution.

Referring to the battery X of Comparative Example 1, this is presumably because it comprises as a positive electrode a higher order nickel hydroxide which is not coated with a yttrium compound on the surface thereof. The resulting positive electrode discharges itself. Simultaneously, the negative electrode tries to discharge by the same capacity as the self-discharged amount of the positive electrode. However, the negative electrode has no electricity and thus oxidizes itself instead of discharging. Thus, an oxide layer is formed on the surface of the positive electrode active material to passivate the positive electrode active material. Accordingly, the positive electrode active material cannot be provided with activity even when subjected to activation treatment.

Referring to the battery Y of Comparative Example 2, this is because, although a high order nickel hydroxide coated with a yttrium compound on the surface thereof is used as a positive electrode, the high order nickel hydroxide has a valence of as high as 2.5. Thus, the negative electrode can be charged only by a valence of 0.5 with respect to that of the positive electrode. Accordingly, when the negative electrode discharges electricity corresponding to a valence of 0.5 during discharging, the entire battery stops discharging. When the valence of the high order nickel hydroxide is less than 2.1, the irreversible capacity of the negative electrode cannot be sufficiently eliminated, making it impossible to effectively use the inner space of the battery. Accordingly, the valence of high order nickel hydroxide is from 2.1 to 2.4, preferably from 2.1 to 2.3.

On the contrary, the battery A of Example 1, the battery B of Example 2 and the battery C of Example 3 each comprise as a positive electrode a high order nickel hydroxide coated with a yttrium compound on the surface thereof, the battery D of Example 4 comprises as a positive electrode a high order nickel hydroxide coated with an erbium compound on the surface thereof, and the battery E of Example 5 comprises as a positive electrode a high order nickel hydroxide coated with a ytterbium compound on the surface thereof. Accordingly, the positive electrode can be prevented from discharging itself, making it possible to maintain the discharge capacity shown shortly after the injection of electrolytic solution even with the passage of time from the injection of electrolytic solution.

It can also be seen that the discharge capacity of the battery C of Example 3, the battery D of Example 4 and the battery E of Example 5 are kept higher than that of the battery A of Example 1 and the battery B of Example 2. This is because that if a yttrium compound, erbium compound or ytterbium compound is added to the slurry, such a compound is attached to the surface of the higher order nickel hydroxide coated with a high order cobalt compound containing alkaline cations on the surface thereof to accelerate the effect exerted by the addition of such a compound. Referring to the batteries C,D and E of Examples 2 to 5, this is presumably because the surface of high order nickel hydroxide is coated with a high order cobalt compound containing alkaline cations, thereby forming a good electrically-conductive network in the positive electrode and hence improving the percent use of active material and the discharge capacity.

Referring to the battery B of Example 2 and the battery A of Example 1, on the other hand, the surface of nickel hydroxide is coated with a yttrium compound before enhancing the order of nickel hydroxide. Thus, the yttrium compound penetrates into the interior of nickel hydroxide, making it impossible to sufficiently attain the effect exerted by the addition of such a compound. The battery A of Example 1 comprises the nickel positive electrode a the preparation of which doesn't involve alkali heat treatment, preventing nickel hydroxide from being converted to high order cobalt compound containing alkaline cations. Thus, higher order nickel hydroxide is somewhat oxidized.

As mentioned above, in accordance with the present invention, the higher order nickel hydroxide is provided with a yttrium compound, erbium compound or ytterbium compound on the surface thereof or in the vicinity thereof, making it possible to obtain a storage battery having a high capacity and excellent storage properties which undergoes no self-discharging.

While the foregoing embodiment of implication of the present invention has been described with reference to the case where the present invention is applied to nickel-hydrogen storage battery, the present invention is not limited to nickel-hydrogen storage battery but can be applied to other alkaline storage batteries such as nickel-cadmium storage battery with similar expected effects.

What is claimed is:

1. An alkaline storage battery comprising a positive electrode active material mainly composed of nickel hydroxide, wherein said nickel hydroxide is a higher order nickel hydroxide covered with a cobalt compound layer on the surface thereof, and at least one compound selected from the group consisting of yttrium compound, erbium compound and ytterbium compound is provided on the surface of said higher order nickel hydroxide or with said cobalt compound layer.

2. The alkaline storage battery according to claim 1, wherein said cobalt compound is a high order cobalt compound containing alkaline cations.

3. The alkaline storage battery according to claim 1, wherein the average valence of said high order nickel hydroxide is from 2.10 to 2.30.

4. The alkaline storage battery according to claim 1, wherein said positive electrode active material comprises a higher order nickel hydroxide of complex particles covered with a cobalt compound on the surface thereof and said higher order nickel hydroxide is provided with at least one compound selected from the group consisting of yttrium compound, erbium compound and ytterbium compound.

5. The alkaline storage battery according to claim 4, wherein said higher order cobalt compound is immersed into the higher order nickel oxide particles and boundary between said cobalt compound and the higher order nickel oxide particles is diminished and composition changes successively.

6. The alkaline storage battery according to claim 1, wherein said cobalt compound is localized on a surface of said higher order nickel oxide particles.

7. The alkaline storage battery according to claim 1, wherein said positive electrode active material further comprises zinc oxide in a soluble state.

8. The alkaline storage battery according to claim 4, wherein said positive electrode active material is filled into a porous metal plate as a current collecting plate to form a positive electrode.

9. A process for the production of an alkaline storage battery comprising a positive electrode active material mainly composed of nickel hydroxide, wherein a step of forming the positive electrode active material comprises:

a retaining step of allowing a cobalt compound and at least one compound selected from the group consisting of yttrium compound, erbium compound and ytterbium compound to be retained on the surface of said nickel hydroxide; and an order-enhancing step of enhancing the order of said nickel hydroxide.

10. The process for the production of an alkaline storage battery according to claim 9, wherein said order-enhancing step is a step of oxidizing said nickel hydroxide with an oxidizing agent.

11. The process for the production of an alkaline storage battery according to claim 9, wherein said retaining step involves mixing said nickel hydroxide with a cobalt compound or coating said nickel hydroxide with a cobalt compound, followed by heat treatment in the presence of an alkaline aqueous solution and oxygen that enhances the order of said cobalt compound.

12. The process for the production of an alkaline storage battery according to claim 9, wherein said order-enhancing step involves the adjustment of the average valence of said higher order nickel hydroxide to a range of from 2.10 to 2.30.

13. A process for the production of an alkaline storage battery comprising a positive electrode active material mainly composed of nickel hydroxide, wherein a step of forming the positive electrode active material comprises:

a retaining step of allowing a cobalt compound to be retained on the surface of said nickel hydroxide;

an order-enhancing step of enhancing the order of said nickel hydroxide; and an attachment step of allowing at least one compound selected from the group consisting of yttrium compound, erbium compound and ytterbium compound to be attached to said higher order nickel hydroxide on the surface thereof.

14. The process for the production of an alkaline storage battery according to claim 13, wherein said order-enhancing step is a step of oxidizing said nickel hydroxide with an oxidizing agent.

15. The process for the production of an alkaline storage battery according to claim 14, wherein said retaining step involves mixing said nickel hydroxide with a cobalt compound or coating said nickel hydroxide with a cobalt compound, followed by heat treatment in the presence of an alkaline aqueous solution and oxygen that enhances the order of said cobalt compound.

16. The process for the production of an alkaline storage battery according to claim 13, wherein said order-enhancing step involves the adjustment of the average valence of said higher order nickel hydroxide to a range of from 2.10 to 2.30.

* * * * *